(12) United States Patent
Bouron et al.

(10) Patent No.: US 9,022,665 B2
(45) Date of Patent: *May 5, 2015

(54) C-SHAPED SPACER FOR ROLLING BEARING

(71) Applicant: Aktiiebolaget SKF, Gothenburg (SE)

(72) Inventors: Cyril Bouron, Avallon (FR);
Jean-Baptiste Magny, Mige (FR);
Pascal Ovize, Chitry le Fort (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,872

(22) Filed: Feb. 14, 2013

(65) Prior Publication Data

US 2013/0216172 A1 Aug. 22, 2013

(30) Foreign Application Priority Data

Feb. 16, 2012 (EP) .................................... 12305176

(51) Int. Cl.
*F16C 33/51* (2006.01)
*F16C 33/46* (2006.01)
*F16C 19/30* (2006.01)
*F16C 33/37* (2006.01)

(52) U.S. Cl.
CPC ................. *F16C 33/46* (2013.01); *F16C 19/30* (2013.01); *F16C 33/4605* (2013.01); *F16C 33/51* (2013.01); *F16C 2300/14* (2013.01); *F16C 33/37* (2013.01); *F16C 2352/00* (2013.01)

(58) Field of Classification Search
CPC .... F16C 33/37; F16C 33/3706; F16C 33/513; F16C 19/30; F16C 19/305; F16C 19/194
USPC ..................... 384/623, 44, 618–622
See application file for complete search history.

(56) References Cited

U.S. PATENT DOCUMENTS

| | | | |
|---|---|---|---|
| 3,847,456 A * | 11/1974 | Schwarzbich | ................ 384/620 |
| 3,938,866 A * | 2/1976 | Martin | .......................... 384/623 |
| 4,861,171 A | 8/1989 | Adachi | |
| 6,779,923 B2 * | 8/2004 | Murata | ........................... 384/44 |
| 2001/0038724 A1 | 11/2001 | Murata | |

FOREIGN PATENT DOCUMENTS

| | | |
|---|---|---|
| DE | 3245332 A1 | 6/1984 |
| FR | 2222898 A5 | 10/1974 |
| GB | 1469841 A | 4/1977 |
| JP | 63123824 U | 8/1988 |
| JP | 2004205029 A | 7/2004 |
| JP | 2007100738 A | 4/2007 |
| JP | 2011163513 A | 8/2011 |

* cited by examiner

*Primary Examiner* — Thomas R Hannon
(74) *Attorney, Agent, or Firm* — Bryan Peckjian; SKF USA Inc. Patent Dept.

(57) ABSTRACT

The spacer is adapted for a rolling bearing comprising an inner ring, an outer ring and at least one row of contact rollers disposed between raceways provided on the rings. The spacer comprises opposite inner and outer portions, facing one another and a lateral portion extending transversally between the inner and outer portions and connected to said portions. The inner and outer portions delimit together with the lateral portion a pocket configured to receive a contact roller. The pocket is laterally open on the side opposite to the lateral portion.

16 Claims, 3 Drawing Sheets

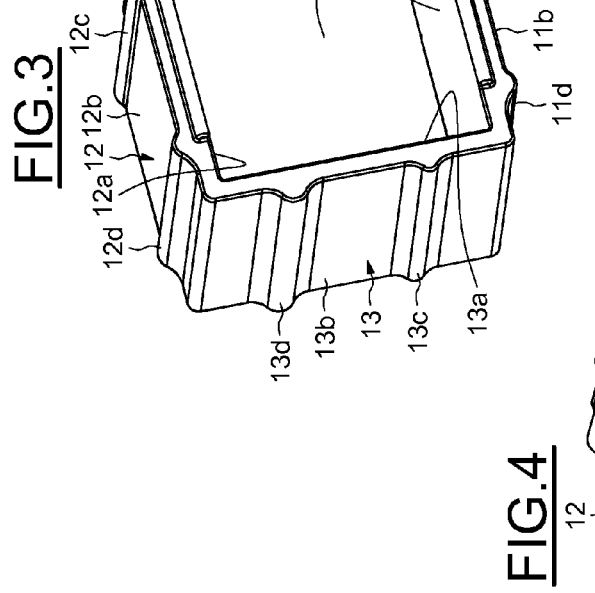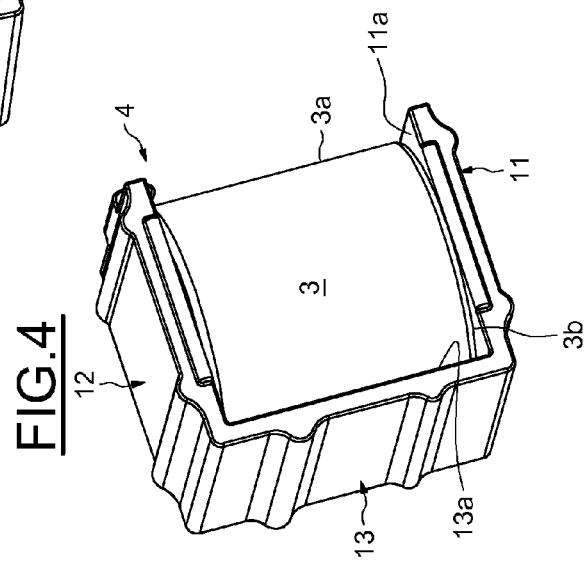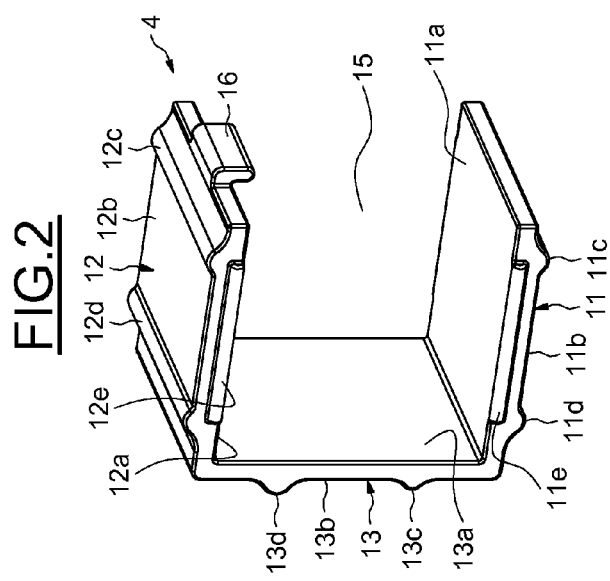

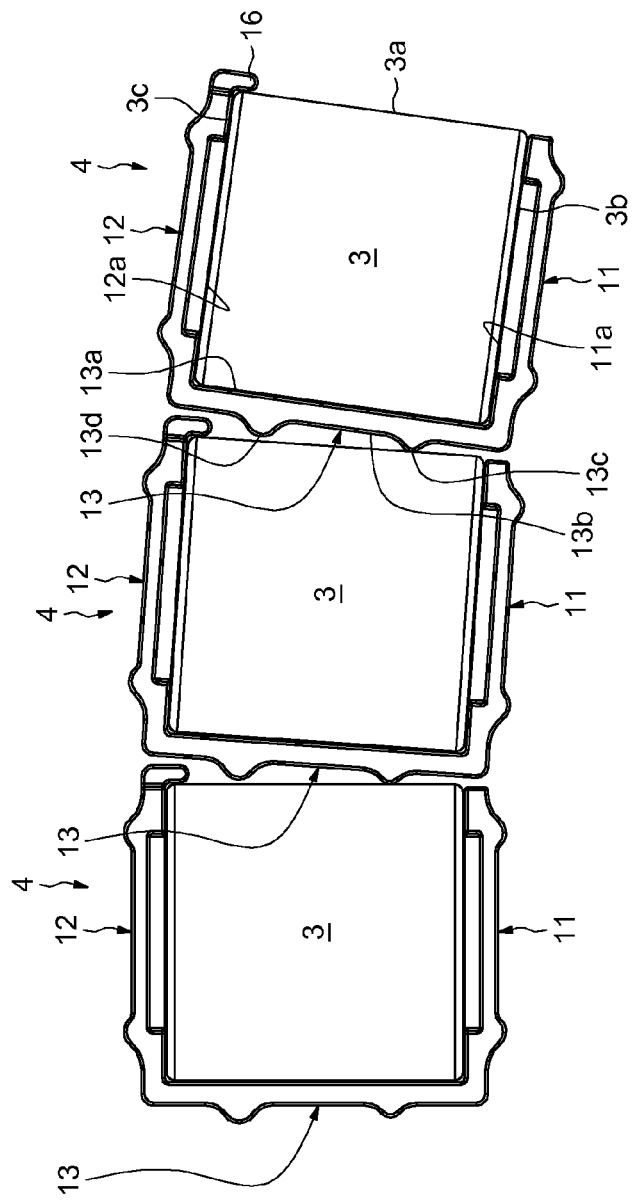

C-SHAPED SPACER FOR ROLLING BEARING

CROSS-REFERENCE TO RELATED APPLICATION

This application claims priority to European patent application no. 12305176.5 filed on Feb. 16, 2012, the contents of which are fully incorporated herein by reference.

FIELD OF THE INVENTION

The present invention relates to the field of rolling bearings, in particular rolling bearings having an inner ring, an outer ring, and one or more rows of contact rollers therebetween. The invention relates more particularly to the field of large-diameter rolling bearings, notably those used in a tunnel boring machine.

BACKGROUND OF THE INVENTION

A large-diameter rolling bearing comprises generally two concentric inner and outer rings, at least a row of contact rollers arranged between raceways provided on said rings, and a plurality of spacers disposed circumferentially between the rollers. Such rolling bearings are generally loaded, both axially and radially, often with a relatively strong load.

French patent FR 2 222 898 relates to apertured spacers for rolling bearing which, by being assembled together, form a cage for the rollers. Each apertured spacer is of a substantially rectangular shape and is provided with a recess retaining the associated roller introduced by force through one aperture, the width of said aperture being less than the diameter of said roller. A convex boss is located at a lower corner of the spacer whereas a concave recess having a complementary shape is located at an opposite lower corner. Adjacent spacers are interengaged by virtue of the engagement of the boss of each spacer in the recess of the adjacent spacer.

With such spacers, the number of contact rollers which can be introduced between the rings of the rolling bearing is strongly limited. This leads to a low load bearing capacity as well as a limited service life.

One aim of the present invention is to overcome these drawbacks.

SUMMARY OF THE INVENTION

It is a particular object of the present invention to provide a spacer adapted to increase the load bearing capacity of the associated rolling bearing.

It is a particular object of the present invention to provide a spacer which is simple to manufacture, economic and having a good reliability.

It is a further object of the present invention to provide a spacer which can be mounted on several rolling bearing diameters with a same roller diameter.

In one embodiment, the spacer for rolling bearing comprising an inner ring, an outer ring and at least one row of contact rollers disposed between raceways provided on the rings, comprises opposite inner and outer portions facing one another and a lateral portion extending transversally between the inner and outer portions and connected to said portions. The inner and outer portions delimit together with the lateral portion a pocket configured to receive a contact roller. The inner and outer portions each comprise a contact surface with an end face of said roller. The pocket is laterally open on the side opposite to the lateral portion.

The inner and outer portions and the lateral portion may have in cross-section the overall shape of a C.

Advantageously, the lateral portion comprises an outer surface provided with at least a rib extending outwards and having a contact surface with an adjacent roller. In one embodiment, the rib extends transversally on the outer surface. The rib may have in cross-section a profile in the shape of an arc of circle. The outer surface may be provided with two spaced ribs having advantageously different thicknesses.

The lateral portion may comprise an inner surface forming a bearing surface for an exterior rolling surface of the roller.

In one embodiment, the outer portion and/or the inner portion comprise, on the side opposite to the lateral portion, at least a retaining hook extending inwards and having an inner surface forming a bearing surface for an exterior rolling surface of the roller.

Advantageously, the spacer is formed in one part from metal or from polymer material.

In another aspect of the invention, a rolling bearing comprises an inner ring, an outer ring, at least one row of contact rollers disposed between raceways provided on the rings and a plurality of spacers as previously defined and disposed circumferentially between the rollers, the pocket of one spacer being laterally open towards the lateral portion of the adjacent separator.

In one embodiment, the inner and outer rings each comprise a guiding surface in contact with the inner portion and/or the outer portion of each spacer.

The rolling bearing as previously defined may be particularly useful as a bearing for a tunnel boring machine.

BRIEF DESCRIPTION OF THE DRAWINGS

The present invention and its advantages will be better understood by studying the detailed description of a specific embodiment given by way of non-limiting example and illustrated by the appended drawings on which:

FIGS. 2 and 3 are perspective views of a spacer of the rolling bearing of FIG. 1, FIG. 4 is a perspective view of the spacer of FIGS. 2 and 3 with its associated roller, and FIG. 5 is a side view showing three spacers and the associated rollers as mounted in the rolling bearing.

DETAILED DESCRIPTION OF THE INVENTION

Figure 1:
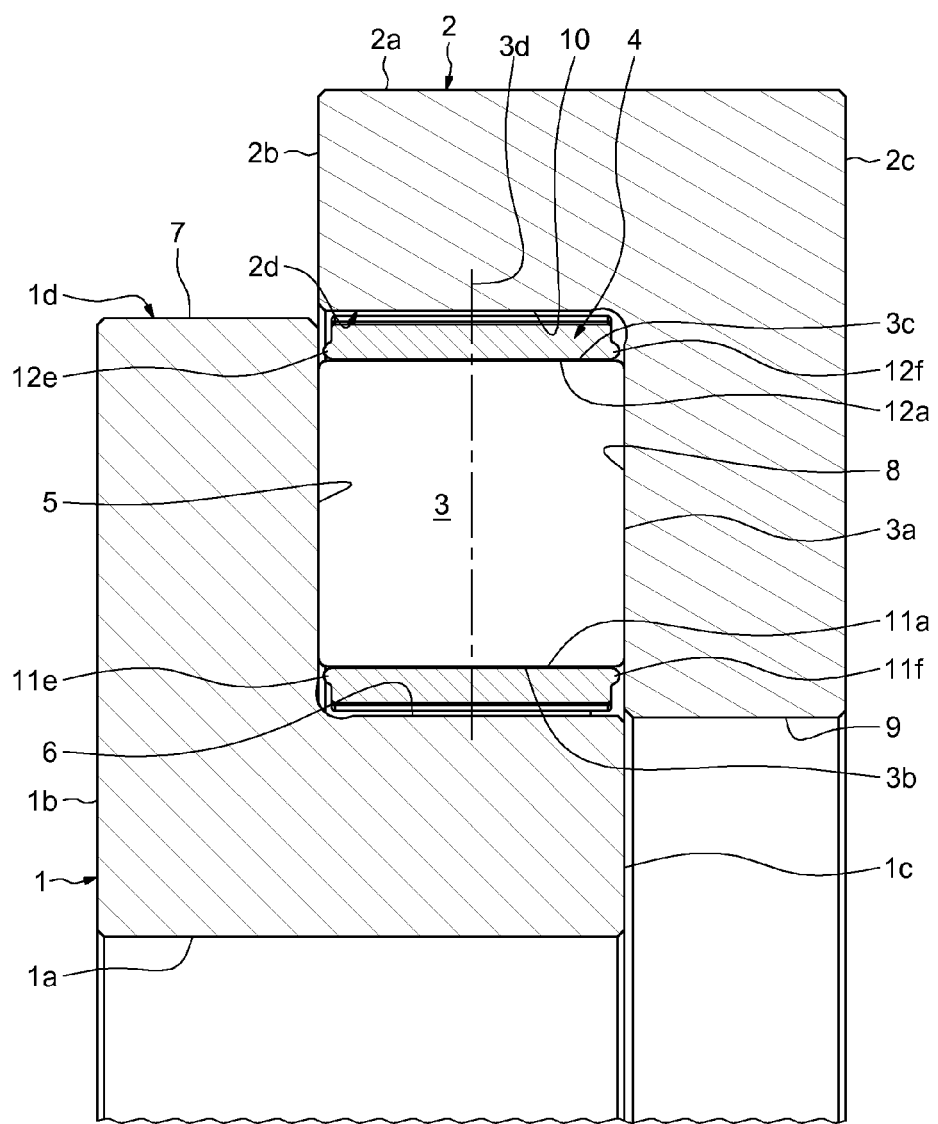
FIG. 1 is a half section of a rolling bearing according to an example of the invention.

The rolling bearing as illustrated on the FIG. 1 is a large-diameter rolling bearing comprising an inner ring 1 and an outer ring 2 between which is housed one row of contact rollers 3. The rolling bearing also comprises a plurality of spacers 4 disposed circumferentially between the rollers 3 to maintain their circumferential spacing.

The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3 are identical with one another and each comprise an exterior rolling surface 3a and opposite end transverse faces 3b, 3c delimiting axially the rolling surface. In the illustrated embodiment, the rolling surface 3a of each roller has a cylindrical profile. Alternatively, the rolling surfaces may have a spherical profile or a logarithmic profile. In the illustrated embodiment, the angle between the rotation axis 3d of each roller and the bearing axis is equal to 90°. The rotation axis 3d of each roller extends radially.

The inner ring 1 has a bore 1a of cylindrical shape designed to be fixed to a chassis or to a structure of machine (not shown) and delimited by opposite radial lateral surfaces 1b, 1c. The inner ring 1 also comprises a stepped exterior cylindrical surface 1d onto which an annular radial raceway 5 is formed. The raceway 5 has in cross-section a straight internal profile in contact with the rolling surfaces 3a of the rollers 3. The raceway 5 is formed by the radial surface provided between a first axial surface 6 of small-diameter and a second axial surface 7 of large-diameter of the stepped exterior cylindrical surface 1d. As will be described later, the axial surface 6 forms an annular guiding surface which may be in radial contact with the spacers 4. The axial guiding surface 6 is straight, disposed perpendicular to the raceway 5 and connected to the edge of small-diameter of said raceway by an annular concave fillet. The guiding surface 6 extends axially from said edge and is connected to the radial surface 1c of the inner ring. The guiding surface 6 and the raceway 5 of the inner ring delimit an annular groove.

The outer ring 2 comprises an outer cylindrical surface 2a delimited by opposite radial lateral surfaces 2b, 2c. The outer ring 2 also comprises a stepped annular bore 2d of cylindrical shape into which an annular radial raceway 8 is formed. The raceway 8 has in cross-section a straight internal profile in contact with the rolling surfaces 3a of the rollers 3. The raceway 5 of the inner ring and the raceway 8 of the outer ring axially face each other and are parallel. The raceway 8 is formed by the radial surface provided between a first axial surface 9 of small-diameter and a second axial surface 10 of large-diameter of the stepped bore 2d. As will be described later, the axial surface 10 forms an annular guiding surface which may be in radial contact with the spacers 4. The guiding surface 10 of the outer ring and the guiding surface 6 of the inner ring radially face each other and are parallel. The guiding surface 10 is straight, disposed perpendicular to the raceway 8 and connected to the edge of large-diameter of said raceway by an annular concave fillet. The guiding surface 10 extends axially from said edge and is connected to the radial surface 2b of the outer ring. The guiding surface 10 and the raceway 8 of the outer ring delimit an annular groove.

The raceway 5 and the guiding surface 6 of the inner ring define together with the raceway 8 and the guiding surface 10 of the outer ring an annular space inside which the rollers 3 and the spacers 4 are disposed. Each roller 3 arranged between the raceways 5, 8 is maintained by the associated spacer 4 which may bear against the guiding surfaces 6, 10 and said raceways 5, 8.

The spacers 4 are identical with one another and each placed between two consecutive rollers 3. The spacers 4 may be made in one part from metal or bronze. Alternatively, the spacers 4 may be made from polymer material such as polyamide, for instance by molding.

As shown on FIGS. 2 to 4, each spacer 4 comprises two parallel inner and outer portions 11, 12 adapted to come into contact with the facing guiding surfaces and the raceways of the inner and outer rings, and a lateral portion 13 extending transversally between said opposite portions 11, 12 and adapted to be located circumferentially between two adjacent rollers 3. The lateral portion 13 is connected to a lateral edge of the inner portion 11 and to the opposite facing edge of the outer portion 12. The inner and outer portions 11, 12 and the lateral portion 13 each have a rectangular shape with similar width, length and thickness. The width of the portions 11, 12 and 13 is slightly smaller than the radius of the roller 3.

As shown on FIG. 1, the raceways 5, 8 and the guiding surface 6, of the inner and outer rings each form a flank having a direct contact surface with the inner and outer parts 11, 12 of each spacer to have a slight relative sliding between each spacer 4 and the rings 1, 2. In order to limit the induced friction torque of the spacers 4, slight axial clearances are foreseen between each spacer and the raceways 5, 8 of the rings and slight radial clearances are foreseen between each spacer and the guiding surface 6, 10.

Referring once again to FIGS. 2 to 4, the inner and outer portions 11, 12 and the lateral portion 13 of each spacer have in cross-section the overall shape of a C and delimit a pocket 15 for receiving one roller 3. On the side opposite to the lateral portion 13, the spacer 4 is deprived of lateral portion extending transversally between the inner and outer portions and connected to said portions. The spacer 4 is deprived of lateral portion symmetric to the lateral portion 13. The pocket 15 is laterally open on the side opposite to the lateral portion 13 between the inner and outer portions 11, 12. In the mounted position of the spacer 4 into the rolling bearing, the pocket 15 is delimited in the circumferential direction only by the lateral portion 13 and is delimited in the radial direction by the inner and outer portions 11, 12. In this mounted position, the pocket 15 of one spacer 4 is circumferentially open towards the adjacent spacer 4. The pocket 15 of each spacer 4 is open both axially in the two directions and circumferentially in one direction. The pocket 15 is open on three sides. With regard to the rotation axis 3d of the associated roller 3, the inner and outer portions 11, 12 extend radially, the lateral portion 13 extends axially between said portions and the pocket 15 is radially open toward the outside. On the side opposite to the lateral portion 13, an opening or aperture is delimited axially by the free edges of the inner and outer portions 11, 12 and extends axially between these portions in order to open laterally the pocket 15.

The inner and outer portions 11, 12 of each spacer have inner planar contact surfaces 11a, 12a facing each other and forming bearing surfaces for the end faces 3b, 3c of the associated roller. The gap between the planar contact surfaces 11a, 12a is substantially equal to the length of the roller 3. The lateral portion 13 comprises an inner planar contact surface 13a forming a bearing surface for the rolling surface 3a of the associated roller.

The spacer 4 further comprises a hook 16 which slightly protrudes inwards toward the inner portion 11 from the free edge of the outer portion 12. The hook 16 is disposed on the outer portion 12 on the side opposite to the lateral portion 13. The hook 16 is centered on the free edge of the outer portion 12 and remains distant from the longitudinal edges of said outer portion. The hook 16 comprises an inner planar contact surface forming a bearing surface for the rolling surface 3a of the associated roller. The hook 16 is adapted to interfere with the roller 3 in order to avoid an escape from the open pocket 15. In the mounted position of the spacer 4 into the rolling bearing, the inner and outer portions 11, 12 maintain the roller 3 in the radial direction, and the lateral portion 13 and the hook 16 maintain the roller 3 in the circumferential direction. The hook 16 forms a circumferential retaining means for the roller 3.

The inner portion 11 of each spacer also comprises a planar outer surface 11b and two spaced guiding ribs 11c, 11d (also referenced as a second plurality of ribs in the claims) provided on said outer surface. The guiding ribs 11c, 11d protrude outwards relative to the outer surface 11b and extend transversally on said outer surface from a longitudinal edge of the inner portion 11 to an opposite longitudinal edge. The opposite longitudinal edges delimit the outer surface 11b. In the disclosed embodiment, the guiding ribs 11c, 11d are identical to one another and have in cross-section a profile in the shape of an arc of circle. Here, the rib 11c is located near to the free edge of the inner portion 11 while the rib 11d is located near to the edge of the inner portion 11 linked to the lateral portion 13.

In the mounted position of the spacer 4 into the rolling bearing, the planar outer surface 11b of the inner portion 11 faces the guiding surface 6 of the inner ring while remaining distant from the latter, and the guiding ribs 11c, 11d may come into contact with said guiding surface 6. With the protruding guiding ribs 11c and 11d, the friction contacts between the inner part 11 of each spacer and the associated guiding surface 6 of the inner ring are reduced. Besides, there is a linear contact between each guiding rib 11c, 11d and the guiding surface 6. With such a contact, there is less friction between each spacer 4 and the inner ring 1.

The inner portion 11 of each spacer further comprises two lateral guiding flanges 11e, 11f each providing on one of the longitudinal edges of said inner portion. Each guiding flange 11e, 11f protrudes outwards from the associated longitudinal edge. In the disclosed embodiment, the guiding flanges 11e, 11f are identical to one another, extend longitudinally between the ribs 11c, 11d and have in cross-section a profile in the shape of an arc of circle.

In the mounted position of the spacer 4 into the rolling bearing, the lateral guiding flange 11e axially faces the raceway 5 of the inner ring while the other lateral guiding flange 11f axially faces the raceway 8 of the outer ring. If an axial contact appears between the spacer 4 and the inner or outer ring, with the protruding guiding flanges 11e and 11f, the friction contacts between the inner portion 11 of each spacer and the raceway 5 or 8 are reduced. Besides, the contact between each guiding flange 11e, 11f and the associated raceway 5, 8 is linear. With such a contact, there is less friction between each spacer 4 and the inner and outer rings 1, 2.

Since the inner and outer portions 11, 12 of each spacer are similar in the illustrated embodiment, only one of them is described here in detail, it being understood that the references "a, b, c, d, e and f" previously used for the inner part 11 are also used for the identical elements of the outer part 12. Similarly to the inner portion 11 of the spacer with regard to the guiding surface 6 of the inner ring, with the protruding guiding ribs 12c, 12d (also referenced as a second plurality of ribs in the claims) of the outer portion, the friction contacts between the outer part 12 of each spacer and the associated guiding surface 10 of the outer ring are reduced. Besides, there is a linear contact between each guiding rib 12c, 12d and the guiding surface 10.

The lateral portion 13 of each spacer comprises a planar outer surface 13b and two spaced guiding ribs 13c, 13d provided on said outer surface. The guiding ribs 13c, 13d (also referenced a first plurality of ribs in the claims) protrude outwards relative to the outer surface 13b and extend transversally on said outer surface from a longitudinal edge of the lateral portion 13 to an opposite longitudinal edge. The opposite longitudinal edges delimit the outer surface 13b. The ribs 13c, 13d have in cross-section a profile in the shape of an arc of circle. In the disclosed embodiment, the ribs 13c, 13d have different thicknesses in order to be used for rolling bearings having different diameters. The rib 13c having the smaller thickness is located near to the edge of the lateral portion 13 linked to the inner portion 11 while the rib 13d is located near to the edge of the lateral portion 13 linked to the outer portion 12.

In the mounted position of the spacers 4 into the rolling bearing as shown on FIG. 5, the guiding rib 13c of one spacer 4 bears against the rolling surface 3a of the roller 3 (referenced as a first area of contact in the claims) which is housed into adjacent spacer 4 since the pocket of said spacer is laterally open towards the lateral portion 13 of the other spacer. There is a direct contact between the guiding rib 13c of the lateral portion of one spacer and the adjacent roller 3 supported by the successive spacer 4 in the circumferential direction. In the mounted position, there is only one lateral portion 13 disposed circumferentially between two successive rollers 3. The pocket 15 of each spacer enables to reduce the circumferential space between two successive rollers 3. Accordingly, the number of rollers 3 disposed between the inner and outer rings 1 and 2 may be increased. This leads to higher load bearing capacity of the rolling bearing as well as an increase of the service life.

In the mounted position of the spacers 4, when the roller 3 of one spacer 4 rotates around its axis, the rib 13c of the adjacent spacer which comes into contact with the rolling surface 3a of said roller act as a guiding means for the roller. Each roller 3 is maintained radially by the inner and outer portions 11, 12 of the associated spacer 4 and circumferentially by the lateral portion 13 of said spacer 4, the retaining hook 16 and the guiding rib 13c of the adjacent spacer 4. With the protruding guiding rib 13c, the friction contacts between the roller 3 disposed into the pocket of one spacer and the lateral portion 13 of the adjacent spacer 4 are reduced. Besides, there is a linear contact between these elements. With such a contact, there is less friction.

During use, the inner and outer portions 11, 12 of each spacer 4 disposed axially between the raceways 5, 8 of the inner and outer rings may come respectively into contact with the guiding surfaces 6, 10 of said rings to guide the spacer and the associated roller 3 while the guiding rib 13c of said spacer bears against the roller 3 which is housed into the adjacent spacer. When the guiding ribs 11c, 11d or 12c, 12d of the spacer come into contact with the associated guiding surface of the rings (also referenced as second and third areas of contact in the claims), both the spacer 4 and its associated roller 3 may slightly pivot around one of said guiding ribs in contact with the guiding surface in order to follow the path of the raceways 5, 8 of the rings. Such a rotation is also made possible with the contact of the guiding rib 13c with the adjacent roller 3. The spacer 4 and the associated roller 3 may also pivot around said guiding rib 13c. Accordingly, the sliding of the rollers 3 along the raceways 5, 8 of the rings is enhanced and the stress level on each spacer 4 is reduced. Otherwise, the guiding ribs 11c, 11d, 12c, 12d of each spacer enable to avoid a high skewing or tilting of the rollers 3.

In the disclosed embodiment, only the lower rib 13c of each spacer comes into contact with the rolling surface 3a of the adjacent roller 3. In case of a rolling bearing having a larger diameter and using the same rollers 3 and spacers 4, both the lower rib 13c and the upper rib 13d of each spacer or only said upper rib 13d may come into contact with the adjacent roller.

The general structure of each spacer 4 is lightened by the provision of a pocket 15 defined by three portions or lugs and open in the circumferential direction towards the outside on the side opposite to the lateral portion 13. A weight reduction for each spacer 4 is thus obtained. The friction contribution of each spacer 4 with regard to the inner and outer rings 1, 2 is reduced by the presence of the ribs 11c to 11f and the ribs 12c to 12f. Similarly, the friction contribution of each spacer 4 with the roller located into the adjacent spacer is also reduced by the presence of the ribs 13a, 13b. The ribs 11c to 11f, 12c to 12f, 13c and 13d of each spacer 4 also improve the guiding of the rollers 3 along the raceways 5, 8 of the rings. Alternatively, it may however be possible to not foresee said ribs on each spacer.

Although the invention has been illustrated on the basis of a rolling bearing having a single row of contact rollers, it should be understood that the invention can be applied to bearings having at least two rows of rollers. Otherwise, in the illustrated embodiment, the rolling bearing is adapted to accommodate axial loads. Alternatively, it may also be possible to have a rolling bearing adapted to accommodate radial loads or both axial and radial loads. Furthermore, the inner ring and/or the outer ring may comprise gearing teeth on their outer periphery, so as to be connected to driving gears for instance connected to the output shaft of a motor.

The invention claimed is:

1. A spacer for a rolling bearing, the rolling bearing having an inner ring, an outer ring, and at least one row of contact rollers disposed between raceways provided on the inner and outer rings, the spacer comprising:
    inner and outer portions opposingly positioned and facing one another,
    a lateral portion extending transversally between the inner and outer portions
    the inner and outer portions and lateral portion being configured such that a cross section of the spacer has a C-shape,
    the inner and outer portions delimiting together with the lateral portion a pocket configured to receive a contact roller,
    the inner and outer portions each provide a contact surface with an end face of said roller, the pocket being laterally open on a side opposite to the lateral portion,
    a retaining hook disposed on at least one of the inner and outer portions on the side opposite the lateral portion, the retaining hook having an inner surface forming a bearing surface for an exterior rolling surface of the contact roller, the retaining hook being positioned on one, but not both, of the inner and outer portions such that the spacer does not enclose all of a side of the contact roller that is opposite to the lateral portion, and
    a first plurality of ribs located on an outer surface of the lateral portion and configured to reduce a first area of contact between the lateral portion and an adjacent contact roller.

2. The spacer according to claim 1, wherein the cross section of the spacer is taken along a plane generally parallel to portions of lateral raceways of the rolling bearing in contact with the contact roller engaged with the spacer.

3. The spacer according to claim 1, wherein the first plurality of ribs is configured to be located so as to contact the adjacent contact roller without contacting the spacer of the adjacent contact roller.

4. The spacer according to claim 3, wherein the first plurality of ribs each extend linearly across the lateral portion and are oriented generally planar perpendicular to portions of lateral raceways of the rolling bearing in contact with the contact roller engaged with the spacer.

5. The spacer according to claim 3, wherein the first plurality of ribs each has in cross-section a profile in the shape of an arc of circle.

6. The spacer according to claim 3, wherein the first plurality of ribs comprises two spaced ribs.

7. The spacer according to claim 6, wherein the two spaced ribs have different thicknesses.

8. The spacer according to claim 1, wherein the lateral portion includes an inner surface forming a bearing surface for an exterior rolling surface of the roller.

9. The spacer according to claim 1, further comprising a second plurality of ribs located on outer surfaces of each of the inner and outer portions and configured to reduce a second area of contact between the inner portion of the spacer and the inner ring and configured to reduce a third area of contact between the outer portion of the spacer and the outer ring.

10. The spacer according to claim 9, wherein the second plurality of ribs each extend linearly across the lateral portion and are oriented generally planar perpendicular to portions of lateral raceways of the rolling bearing in contact with the contact roller engaged with the spacer.

11. The spacer according to claim 9, wherein the second plurality of ribs each has in cross-section a profile in the shape of an arc of circle.

12. The spacer according to claim 9, wherein the second plurality of ribs comprises two spaced ribs.

13. The spacer according to claim 9, wherein the two spaced ribs have different thicknesses.

14. The spacer according to claim 1, further comprising being formed in one part from metal or from a polymer material.

15. A rolling bearing comprising:
    an inner ring,
    an outer ring,
    at least one row of contact rollers disposed between raceways provided on the rings, and
    a plurality of spacers comprising:
    inner and outer portions opposingly positioned and facing one another, and
    a lateral portion extending transversally between the inner and outer portions
    the inner and outer portions and lateral portion being configured such that a cross section of the spacer has a C-shape,
    the inner and outer portions delimiting together with the lateral portion a pocket configured to receive a contact roller,
    the inner and outer portions each provide a contact surface with an end face of said roller, the pocket being laterally open on a side opposite to the lateral portion,
    the spacers are disposed circumferentially between the rollers, the pocket of one spacer being laterally open towards the lateral portion of the adjacent spacer,
    a retaining hook disposed on at least one of the inner and outer portions on the side opposite the lateral portion, the retaining hook having an inner surface forming a bearing surface for an exterior rolling surface of the contact roller, the retaining hook being positioned on one, but not both, of the inner and outer portions such that the spacer does not enclose all of a side of the contact roller that is opposite to the lateral portion, and
    a first plurality of ribs located on an outer surface of the lateral portion and configured to reduce a first area of contact between the lateral portion and an adjacent contact roller.

16. The rolling bearing according to claim 15, wherein the inner and outer rings further comprise a guiding surface in contact with at least one of the inner portion and the outer portion of each spacer.

* * * * *